United States Patent
Briesewitz et al.

(10) Patent No.: US 12,012,085 B2
(45) Date of Patent: Jun. 18, 2024

(54) BRAKE CYLINDER ARRANGEMENT AND BRAKING SYSTEM

(71) Applicant: Continental Teves AG & Co. OHG, Frankfurt am Main (DE)

(72) Inventors: Rüdiger Briesewitz, Frankfurt am Main (DE); Joseph Dolmaya, Frankfurt am Main (DE); Gunther Buschmann, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 539 days.

(21) Appl. No.: 17/155,329

(22) Filed: Jan. 22, 2021

(65) Prior Publication Data

US 2021/0139004 A1  May 13, 2021

Related U.S. Application Data

(63) Continuation of application No. PCT/EP2019/069305, filed on Jul. 17, 2019.

(30) Foreign Application Priority Data

Jul. 24, 2018 (DE) .................... 10 2018 212 320.9

(51) Int. Cl.
  *B60T 8/32* (2006.01)
  *B60T 7/04* (2006.01)
  *B60T 13/68* (2006.01)
  *B60T 11/16* (2006.01)

(52) U.S. Cl.
  CPC ............ *B60T 7/042* (2013.01); *B60T 13/686* (2013.01); *B60T 11/16* (2013.01); *B60Y 2400/306* (2013.01); *B60Y 2400/81* (2013.01)

(58) Field of Classification Search
  CPC ........ B60T 7/042; B60T 13/686; B60T 11/16; B60Y 2400/306; B60Y 2400/81
  USPC ........ 303/3, 10, 15, 20, 122.09, 122.11, 155
  See application file for complete search history.

(56) References Cited

U.S. PATENT DOCUMENTS

| | | | |
|---|---|---|---|
| 3,932,002 A | 1/1976 | Komoda et al. | |
| 4,140,201 A | 2/1979 | Young | |
| 5,307,684 A | 5/1994 | Moss | |
| 9,067,572 B2* | 6/2015 | Lichterfeld | ........... B60T 8/1705 |
| 2008/0001474 A1 | 1/2008 | Takenouchi et al. | |

(Continued)

FOREIGN PATENT DOCUMENTS

| | | |
|---|---|---|
| CN | 103693035 A | 4/2014 |
| CN | 103728068 A | 4/2014 |

(Continued)

OTHER PUBLICATIONS

Chinese Notification of Allowance issued Aug. 1, 1022 for the counterpart Chinese Patent Application for Invention No. 201980041115.6.

(Continued)

*Primary Examiner* — Christopher P Schwartz

(57) ABSTRACT

A brake cylinder arrangement has a brake cylinder, a pressure sensor, and a pressure reducer, wherein the pressure reducer transfers pressures from the brake cylinder to the pressure sensor differently, depending on the input pressure range. The invention furthermore relates to a braking system having a brake cylinder arrangement of this kind.

16 Claims, 1 Drawing Sheet

(56) References Cited

U.S. PATENT DOCUMENTS

| | | |
|---|---|---|
| 2010/0211282 A1 | 8/2010 | Nakata et al. |
| 2014/0084674 A1 | 3/2014 | Lee |
| 2014/0102222 A1 | 4/2014 | Wade |
| 2016/0167629 A1 | 6/2016 | Bunk |

FOREIGN PATENT DOCUMENTS

| | | | |
|---|---|---|---|
| CN | 105189223 | A | 12/2015 |
| DE | 2750877 | A1 | 5/1978 |
| DE | 3440599 | A1 | 5/1986 |
| DE | 4029793 | A1 | 3/1992 |
| DE | 102011085329 | A1 | 5/2013 |
| DE | 102013213227 | A1 | 1/2015 |
| EP | 0420949 | A1 | 4/1991 |
| EP | 1873029 | A1 | 1/2008 |
| EP | 2181028 | A2 | 5/2010 |
| JP | 2006199089 | A | 8/2006 |
| JP | 2011033335 | A | 2/2011 |
| KR | 1020140040916 | A | 4/2014 |

OTHER PUBLICATIONS

European Examination Report dated Sep. 26, 2022 for the counterpart European Patent 19742345.2.
Decision for Grant of Patent dated Oct. 28, 2022 for the counterpart Korean Patent Application 10-2020-7036519.
Search Report dated Jul. 24, 2018 from corresponding German Patent Application No. DE 10 2018 212 320.9.
International Search Report and Written Opinion dated Oct. 11, 2019 from corresponding International Patent Application No. PCT/EP2019/069305.
Opinions on Notice of Grounds for Rejection, dated Apr. 25, 2022 (Translated) from corresponding Korean patent application No. 10-2020-7036519.
Opinions on Notice of Grounds for Rejection, dated Apr. 25, 2022 (Original) from corresponding Korean patent application No. 10-2020-7036519.
Chinese First Office Action issued on Oct. 28, 2021 for the counterpart Chinese Patent Application No. 201980041115.6.

* cited by examiner

BRAKE CYLINDER ARRANGEMENT AND BRAKING SYSTEM

CROSS-REFERENCE TO RELATED APPLICATIONS

This application claims the benefit of PCT Application PCT/EP2019/069305, filed Jul. 17, 2019, which claims priority to German Application DE 10 2018 212 320.9, filed Jul. 24, 2018. The disclosures of the above applications are incorporated herein by reference.

TECHNICAL FIELD

The invention relates to a brake cylinder arrangement for a braking system of a motor vehicle.

BACKGROUND

A brake cylinder arrangement typically has at least one brake cylinder. This is used to give the driver the possibility of producing a pressure in the braking system by means of a connected brake pedal. This pressure can act, for example, on a simulator, can be electronically detected and can then be converted into actual braking, or it can also act directly on wheel brakes. The latter can be the case, in particular, in the event of a hydraulic fallback level or other emergency functionalities.

A pressure sensor is typically used to monitor the pressure in a brake cylinder. However, the problem arises here that a high resolution is necessary in a low pressure range up to about 70 bar but that, in principle, there is a need to monitor a significantly higher pressure range, up to about 280 bar, for example, in order to prevent damage to the brake cylinder due to the initiation of emergency measures. In principle, it is possible to use two sensors for this purpose, but it is necessary, in particular, to protect the high-resolution pressure sensor for the lower pressure range from the high pressures. This has proven to be complex and expensive.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A brake cylinder arrangement has a brake cylinder, a pressure sensor and a pressure reducer. The brake cylinder is connected to the pressure sensor via the pressure reducer in order to sense a pressure in the brake cylinder. The pressure reducer preferably passes the pressure from the brake cylinder to the pressure sensor with a first modification factor in a first input pressure range, which extends from 0 bar to a predetermined pressure threshold, and, if the pressure exceeds the pressure threshold, preferably passes the pressure from the brake cylinder to the pressure sensor with a second modification factor, plus the pressure transferred at the pressure threshold, in a second input pressure range, which includes pressures greater than the predetermined pressure threshold.

By virtue of the use of the pressure reducer, the use of one pressure sensor that monitors the entire pressure range required and can provide a sufficiently high resolution in a low pressure range is sufficient. The pressure reducer can be configured in a suitable way for this purpose, for example through the choice of the two modification factors as will be described below.

Here, transfer with a modification factor should be interpreted, e.g., to mean that the pressure is multiplied by the factor before being transferred. If the first modification factor is 0.7, for example, an input pressure of 1 bar is transferred as 0.7 bar. If the first modification factor is 1, for example, the pressure in the first input pressure range is transferred unchanged.

In the second input pressure range, only the pressure that exceeds the pressure threshold may be multiplied by the second modification factor. The indicated calculation procedure may be interpreted to mean that the input pressure at the pressure threshold continues to be transferred with the first modification factor and that, at higher pressures, the transferred pressure determined in this way has added to it the pressure determined from the pressure component that exceeds the pressure threshold multiplied by the second modification factor. Thus, if the pressure threshold is 80 bar, for example, a pressure of 56 bar is transferred at the pressure threshold in the case of a first modification factor of 0.7. If the input pressure applied is 100 bar, it exceeds the pressure threshold by 20 bar. If the second modification factor is 0.5, for example, then, at an input pressure of 100 bar, a pressure of 56 bar+20 bar*0.5=66 bar is transferred.

The predetermined pressure threshold may have a value of between 60 bar and 80 bar or a value of 70 bar. Such a value is suitable for typical brake master cylinders or braking systems.

The first modification factor may have a value of 1. This allows direct linear transfer of the pressure from the brake cylinder to the pressure sensor, allowing it to be detected without distortion.

The second modification factor may have a value of less than 1. It is thereby possible to transfer pressures that are above the predetermined pressure threshold to the pressure sensor in an attenuated manner, thus ensuring that a lower maximum measurement range than the maximum pressure to be expected in the brake cylinder is sufficient for said sensor. Above the predetermined pressure threshold, such a high resolution is typically no longer required.

The pressure reducer may be a hydraulic pressure reducer.

In particular, the brake cylinder can be a brake master cylinder of a motor vehicle. In such an application, the brake cylinder arrangement described here can be used.

The pressure sensor is preferably configured to trigger a burst protection function if the pressure reaches a predetermined safety threshold. The predetermined safety threshold, which is defined, in particular, at the pressure sensor, can be fixed, in particular, taking into account the second modification factor and also the pressure threshold and the first modification factor. The burst protection function can allow pressure discharge from the brake cylinder, for example, to prevent destruction of other components.

The safety threshold preferably corresponds to an input pressure of the pressure reducer of between 260 bar and 280 bar, or 270 bar. Such values have proven advantageous for typical applications. Typically, it is, in particular, the second modification factor and also the pressure threshold and the first modification factor that have to be taken into account during this process.

Furthermore, a braking system for a motor vehicle has a brake cylinder arrangement according to the invention. In this regard, recourse can be had to all the embodiments and variants described herein. Moreover, the braking system has a number of brakes, which are connected to the brake cylinder of the brake cylinder arrangement. Actuation of the brakes can thereby be accomplished.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
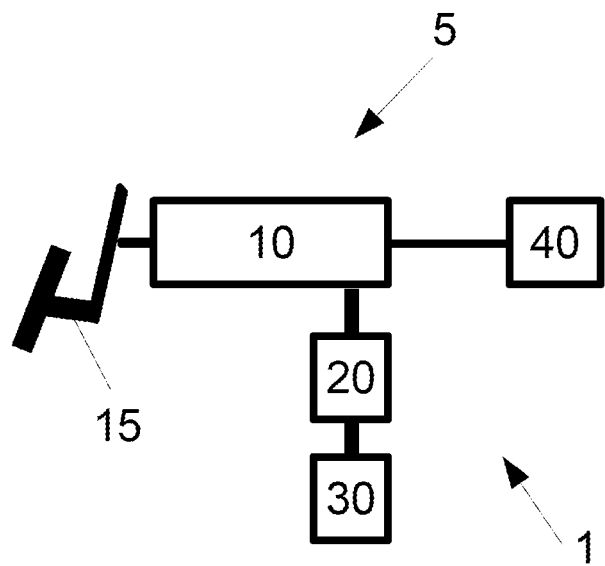
FIG. 1 shows a braking system according to the invention.

FIG. 1 shows a braking system 1 according to an exemplary embodiment of the invention. The braking system 1 has a brake cylinder arrangement 5, a brake pedal 15 and a number of brakes 40. It should be understood that these components are illustrated here only schematically in a block diagram.

The brake cylinder arrangement 5 has a brake cylinder 10, which is connected to the brake pedal 15. It is thereby possible for a driver to produce a pressure in the brake cylinder 10 by actuating the brake pedal 15. In this way, the brakes 40 can be actuated.

The brake cylinder arrangement 5 furthermore has a pressure reducer 20 and a pressure sensor 30. As shown, the pressure sensor 30 is connected to the brake cylinder 10 via the pressure reducer 20.

Figure 2:
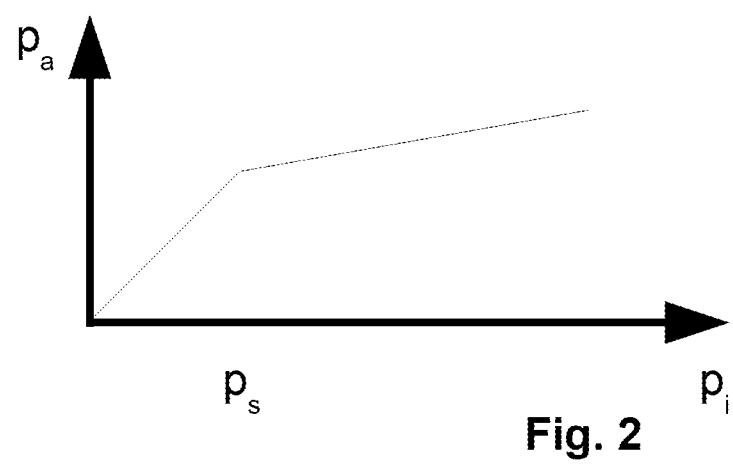
FIG. 2 shows a transfer characteristic of the pressure reducer illustrated in FIG. 1.

The pressure reducer 20 has the transfer characteristic illustrated in FIG. 2. Here, the input pressure $p_i$ is plotted on the horizontal axis, and the output pressure $p_a$ is plotted on the vertical axis.

The input pressure $p_i$ is thus the pressure prevailing in the brake cylinder 10. The output pressure $p_a$ is the pressure which is transferred to the pressure sensor 30.

As shown, pressure transfer by the pressure reducer 20 is initially unchanged up to a predetermined pressure threshold $p_s$, i.e. a first modification factor of 1 is applied. In other words, the input pressure $p_i$ is equal to the output pressure $p_a$.

Above the predetermined pressure threshold $p_s$, however, the illustrated curve is shallower, i.e. a second modification factor less than 1 is used. The output pressure $p_a$ is thus attenuated in comparison with the input pressure $p_i$. It should be understood that the pressure attained at the predetermined pressure threshold $p_s$ serves as a reference, i.e. the pressure component of the input pressure $p_i$ that exceeds the pressure threshold $p_s$ is multiplied by the second modification factor and added to the output pressure $p_a$ at the pressure threshold.

In the present case, the predetermined pressure threshold $p_s$ is 70 bar, wherein the maximum pressure to be expected in the brake cylinder is about 270 bar. The illustrated transfer characteristic of the pressure reducer 20 makes it possible to use a pressure sensor 30 which does not have to be designed for a pressure up to 270 bar but can have a lower measurement range. This makes the choice of pressure sensor 30 considerably easier.

It should further be pointed out that refinements, features and variants which are described in the various embodiments or exemplary embodiments and/or shown in the figures can be combined with one another in any desired manner. Single or multiple features may be interchanged with one another in any desired manner. Combinations of features arising therefrom are intended to be understood to be covered by the disclosure of this application as well.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A brake cylinder arrangement comprising:
   a brake cylinder;
   a pressure sensor connected to the brake cylinder to sense a pressure in the brake cylinder;
   a pressure reducer which passes the pressure from the brake cylinder to the pressure sensor with a first modification factor in a first input pressure range, which extends from 0 bar to a predetermined pressure threshold and when the pressure exceeds the pressure threshold, passes the pressure from the brake cylinder to the pressure sensor with a second modification factor; and
   wherein the pressure exceeding the pressure threshold is in a second input pressure range, which includes pressures greater than the predetermined pressure threshold.

2. The brake cylinder arrangement as claimed in claim 1, wherein the predetermined pressure threshold is between 60 bar and 80 bar.

3. The brake cylinder arrangement as claimed in claim 1, wherein the first modification factor has a value of 1.

4. The brake cylinder arrangement as claimed in claim 1, wherein the second modification factor has a value of less than 1.

5. The brake cylinder arrangement as claimed in claim 1, wherein the pressure reducer is a hydraulic pressure reducer.

6. The brake cylinder arrangement as claimed in claim 1, wherein the brake cylinder is a brake master cylinder of a motor vehicle.

7. The brake cylinder arrangement as claimed in claim 1, wherein the pressure sensor is configured to trigger a burst protection function when the pressure reaches a predetermined safety threshold.

8. The brake cylinder arrangement as claimed in claim 7, wherein the safety threshold corresponds to an input pressure of the pressure reducer of between 260 bar and 280 bar.

9. A braking system for a motor vehicle, comprising:
   a brake cylinder arrangement including;
      a brake cylinder;
      a pressure sensor connected to the brake cylinder to sense a pressure in the brake cylinder;
      a pressure reducer which passes the pressure from the brake cylinder to the pressure sensor with a first modification factor in a first input pressure range, which extends from 0 bar to a predetermined pressure threshold and when the pressure exceeds the pressure threshold, passes the pressure from the brake cylinder to the pressure sensor with a second modification factor; and wherein the pressure exceeding the pressure threshold is in a second input pressure range, which includes pressures greater than the predetermined pressure threshold; and a plurality of brakes, which are connected to the brake cylinder of the brake cylinder arrangement.

10. The braking system as claimed in claim 9, wherein the predetermined pressure threshold is between 60 bar and 80 bar.

11. The braking system as claimed in claim 9, wherein the first modification factor has a value of 1.

12. The braking system as claimed in claim 9, wherein the second modification factor has a value of less than 1.

13. The braking system as claimed in claim 9, wherein the pressure reducer is a hydraulic pressure reducer.

14. The braking system as claimed in claim 9, wherein the brake cylinder is a brake master cylinder of a motor vehicle.

15. The braking system as claimed in claim 9, wherein the pressure sensor is configured to trigger a burst protection function when the pressure reaches a predetermined safety threshold.

16. The braking system as claimed in claim 15, wherein the safety threshold corresponds to an input pressure of the pressure reducer of between 260 bar and 280 bar.

* * * * *